United States Patent
Myllykoski et al.

(10) Patent No.: US 10,044,287 B2
(45) Date of Patent: Aug. 7, 2018

(54) CONVERTER SYSTEM HAVING CARBON FIBER CONDUCTOR

(71) Applicant: ABB Technology OY, Helsinki (FI)

(72) Inventors: Pirkka Myllykoski, Helsinki (FI); Jaani Kärppä, Helsinki (FI)

(73) Assignee: ABB Technology Oy, Helsinki (FI)

( * ) Notice: Subject to any disclaimer, the term of this patent is extended or adjusted under 35 U.S.C. 154(b) by 0 days.

(21) Appl. No.: 14/790,912

(22) Filed: Jul. 2, 2015

(65) Prior Publication Data

US 2016/0013736 A1    Jan. 14, 2016

(30) Foreign Application Priority Data

Jul. 11, 2014   (EP) ..................................... 14176638

(51) Int. Cl.
| | |
|---|---|
| *H02M 5/458* | (2006.01) |
| *H02M 7/00* | (2006.01) |
| *H01B 5/02* | (2006.01) |
| *H01B 1/04* | (2006.01) |
| *H02M 7/537* | (2006.01) |

(52) U.S. Cl.
CPC .............. *H02M 7/003* (2013.01); *H01B 1/04* (2013.01); *H01B 5/02* (2013.01); *H02M 5/458* (2013.01); *H02M 7/537* (2013.01)

(58) Field of Classification Search
CPC ...... H02M 5/458; H02M 7/003; H02M 7/537; H02M 7/5387; H01B 1/04; H01B 5/02; H01B 7/30; H01B 7/306; H02G 5/00
See application file for complete search history.

(56) References Cited

U.S. PATENT DOCUMENTS

| | | | | |
|---|---|---|---|---|
| 4,684,762 | A * | 8/1987 | Gladfelter | ............... D03D 15/00 139/425 R |
| 2005/0045366 | A1* | 3/2005 | Wolff | ................... H01B 7/0009 174/113 R |
| 2008/0151583 | A1 | 6/2008 | Matsumoto | |
| 2008/0156525 | A1 | 7/2008 | Deve et al. | |
| 2012/0006665 | A1* | 1/2012 | Sologuren-Sanchez | ................. H02G 5/002 200/5 A |

(Continued)

FOREIGN PATENT DOCUMENTS

| | | |
|---|---|---|
| DE | 20315006 U1 | 2/2004 |
| JP | 200147170 A | 6/2006 |
| JP | 2006147170 A | 6/2006 |

OTHER PUBLICATIONS

Machine translation of German Patent Publication DE 20315006 U1. Obtained from http://www.epo.org/searching-for-patents/technical/espacenet.html on Oct. 13, 2016.*

(Continued)

*Primary Examiner* — Fred E Finch, III
(74) *Attorney, Agent, or Firm* — Taft Stettinius & Hollister LLP; J. Bruce Schelkopf

(57) ABSTRACT

A converter system comprising a capacitance (C), an inverter (20) comprising at least two controllable semiconductor switches (S1, S2, S3, S4, S5, S6), and at least two DC conductors (100, 200) connected between the capacitance (C) and the at least two controllable semiconductor switches (S1, S2, S3, S4, S5, S6), wherein at least one of the at least two DC conductors (100, 200) comprises carbon fiber.

20 Claims, 1 Drawing Sheet

(56) References Cited

U.S. PATENT DOCUMENTS

| | | | | |
|---|---|---|---|---|
| 2012/0034498 | A1* | 2/2012 | Hsu | H01M 8/0206 |
| | | | | 429/10 |
| 2012/0111614 | A1* | 5/2012 | Free | B82Y 30/00 |
| | | | | 174/257 |
| 2014/0153300 | A1* | 6/2014 | Mori | H02M 7/003 |
| | | | | 363/44 |
| 2014/0330489 | A1* | 11/2014 | Sakamoto | H02M 7/003 |
| | | | | 701/50 |
| 2015/0044960 | A1* | 2/2015 | Hara | B29C 45/14467 |
| | | | | 454/254 |
| 2015/0107870 | A1* | 4/2015 | Roselli | B60R 16/03 |
| | | | | 174/68.2 |
| 2017/0125722 | A1* | 5/2017 | Wehlus | H01L 51/5212 |

OTHER PUBLICATIONS

Machine translation of Japanese Patent Publication JP 2006-147170 A. Obtained from https://dossier1.j-platpat.inpit.go.jp/tri/all/odse/ODSE_GM101_Top.action on Oct. 13, 2013.*

Endo, M. And Dresselhaus, M. S. "Carbon Fibers and Carbon Nanotubes". Shinshu University, Nagano, Japan and Massachusetts Institute of Technology, Cambridge, MA. Exact publication date unknown, obtained on May 10, 2017 from https://stuff.mit.edu/afs/athena/activity/t/tinytech/Nanostructures/Spring2003/MDresselhaus/i789.pdf.*

McKenzie, A. B. "Characterization of electrical conductivity of carbon fiber/epoxy composites with conductive AFM and scanning microwave impedance microscopy". Diss. University of Illinois at Urbana—Champaign, 2015. Obtained on May 10, 2017 from https://www.ideals.illinois.edu/handle/2142/88098.*

Hart, R. And Zhupansika, O. "Four Probe Electrical Resistance Characterization of Carbon Fiber and Carbon Nanotube Buckypaper Composites." Proceedings of the American Society for Composites: Thirty-First Technical Conference. 2016. Obtained on May 10, 2017 from https://mech.utah.edu/ASC2016/assets/3713.pdf.*

M Endo, et al. "Vapor-grown carbon fibers (VGCFs): Basic properties and their battery applications", Carbon, vol. 39, Issue 9, Aug. 2001, pp. 1287-1297, ISSN 0008-6223, https://doi.org/10.1016/S0008-6223(00)00295-5. (http://www.sciencedirect.com/science/article/pii/S0008622300002955).*

Definition of "Bus Bar" from Merriam Webster Dictionary. Obtained on May 11, 2017 from https://www.merriam-webster.com/dictionary/bus%20bar.*

Table of resistivity of common materials. Obtained on May 11, 2017 from http://hyperphysics.phy-astr.gsu.edu/hbase/Tables/rstiv.html.*

Table of resistance of typical AWG wire guages. Obtained on May 11, 2017 from http://hyperphysics.phy-astr.gsu.edu/hbase/Tables/wirega.html.*

European Patent Office, European Search Report issued in European Patent Application No. 14176638 dated Mar. 16, 2015, 9 pp.

* cited by examiner

CONVERTER SYSTEM HAVING CARBON FIBER CONDUCTOR

FIELD OF THE INVENTION

The invention relates to a converter system.

BACKGROUND OF THE INVENTION

An inverter is an electrical device enabling generation of a voltage with a variable frequency. Inverters may be used in connection with motors for driving them with a variable frequency. An inverter may also be a part of a frequency converter used for driving a motor or another load, for example. A frequency converter typically consists of a rectifier and an inverter, between which there is a direct-voltage intermediate circuit. The rectifier and the inverter may also be positioned physically apart from each other, and one rectifier may feed several inverters via a common intermediate circuit or, alternatively, several rectifiers may feed one inverter. The intermediate circuit typically comprises a capacitance consisting of one or more capacitors.

FIG. 1 shows an example of a converter system. The exemplary converter system may comprise a rectifier 30 and an inverter 20, between which there is provided a DC intermediate circuit 10 with capacitance C. An example of the rectifier 30 is a diode bridge D1 to D6, which obtains its supply from an AC (Alternating Current) source U1, V1, W1, which is for instance a 50 or 60-Hz AC network, and an example of the inverter 20 is a semiconductor bridge implemented by means of transistors S1 to S6, such as IGBTs (Insulated-Gate Bipolar Transistor) or FETs (Field-Effect Transistor), or other controllable semiconductor switches, which may be controlled according to a modulation scheme used. The inverter 20 may be used to control the power transferred from the intermediate circuit 10 to its output U2, V2, W2. Accordingly the supply from the output U2, V2, W2 of the inverter 20 may be a three-phase AC output.

The capacitance C of the intermediate circuit 10 is connected to the semiconductor switches S1 to S6 of the inverter 20 via at least two DC conductors 100, 200. In the case of a two-level inverter as shown in the example of FIG. 1, such conductors may comprise at least one positive DC conductor 100 and one negative DC conductor 200 such that the positive DC conductor 100 is connected to a positive pole or poles of the capacitance C and the negative DC conductor 200 is connected to a negative pole or poles of the capacitance C.

A problem related to the above converter system is that in use an undesirable high frequency voltage oscillation may be generated into the DC conductors 100, 200 as a result of the operation of the converter system. In the case of DC conductors made of copper, the voltage oscillation can be reduced by increasing the length of the DC conductors and thus the resistance thereof. However, increasing the length of the DC conductors also increases the inductance thereof, which is not desirable.

BRIEF DESCRIPTION OF THE INVENTION

An object of the invention is to provide a method and an apparatus for implementing the method so as to solve or at least alleviate the above problem. The object of the invention is achieved by a converter system that is characterized by what is stated in the independent claim. Preferred embodiments of the invention are described in the dependent claims.

The invention is based on the idea that at least one of the at least two DC conductors connected between the capacitance and the controllable semiconductor switches comprises carbon fibre.

The solution of the invention provides the advantage that the voltage oscillation can be reduced due to the resistivity of carbon fibre that is higher than that of copper, for example, without increasing the inductance of the DC conductors.

BRIEF DESCRIPTION OF THE FIGURES

The invention will now be explained in greater detail in connection with preferred embodiments and with reference to the attached drawings, in which.

DETAILED DESCRIPTION OF THE INVENTION

The application of the invention is not restricted to any specific system, but it may be applied to various converter systems that comprise a capacitance and an inverter. In addition, the use of the invention is not restricted to any system utilizing a specific basic frequency or to any specific voltage level.

According to an embodiment, a converter system comprising a capacitance C and an inverter 20 comprising at least two controllable semiconductor switches S1 to S6 further comprises at least two DC conductors 100, 200 connected between the capacitance C and the at least two controllable semiconductor switches S1 to S6. It should be noted that the number of conductors 100, 200 between the capacitance C and the at least two controllable semiconductor switches S1 to S6 of the inverter 20 may vary and depends on the converter system in question. According to an embodiment, at least one of the at least two DC conductors 100, 200 comprises carbon fibre. According to an embodiment, at least a part of said at least one of the at least two DC conductors 100, 200 consists of carbon fibre or a carbon fibre composite. In other words, either a part or portion of said at least one of the at least two DC conductors 100, 200 may be carbon fibre or a carbon fibre composite, or the whole of said at least one of the at least two DC conductors 100, 200 may be carbon fibre or carbon fibre composite. According to an embodiment, the carbon fibre may be woven carbon fibre, such as a woven carbon fibre mat, for example. According to another embodiment, the carbon fibre composite may be carbon-fibre-reinforced polymer. Such a DC conductor comprising at least a portion of a carbon fibre composite may be manufactured by injection moulding or pultrusion, for example. The composition and properties of the carbon fibre used may vary and depend on the requirements and properties of the converter system in question.

Figure 1:
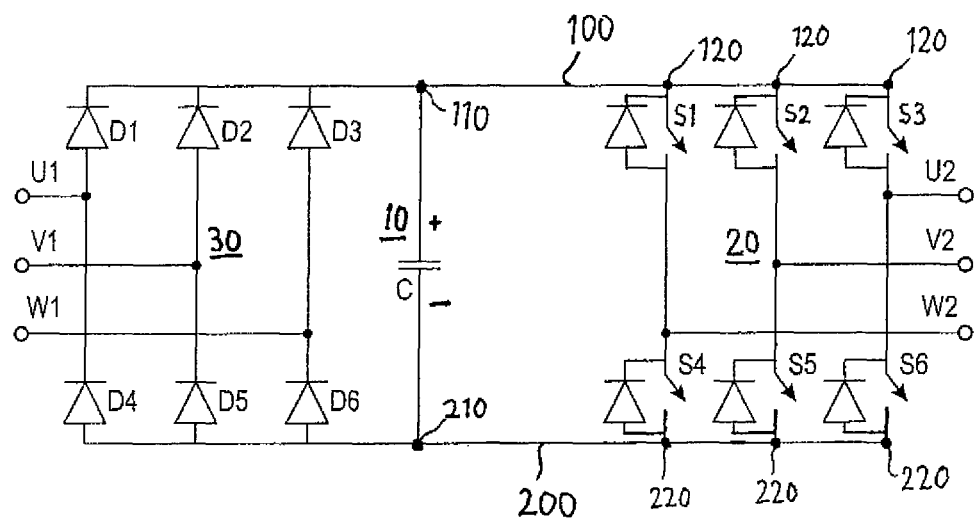
FIG. 1 shows a circuit diagram of a converter system according to an embodiment.

An example of a converter system is shown in FIG. 1, which shows two DC conductors 100, 200 connected between the capacitance C and the controllable semiconductor switches S1 to S6 of the inverter 20. It should be noted that while the example of FIG. 1 shows only two DC conductors 100, 200, it is also possible to have more than two DC conductors connected between the capacitance C and the controllable semiconductor switches S1 to S6 of the inverter 20. According to an embodiment, the DC conductors 100, 200 may be bus bars. Thus, the upper DC conductor 100 may be a positive DC bus bar and the lower DC conductor 200 may be a negative DC bus bar. According to an embodiment, the positive DC bus bar 100 is connected to a positive pole or poles of the capacitance C and the negative DC bus bar 200 is connected to a negative pole or poles of the capacitance C. According to an embodiment, the at least two controllable semiconductor switches S1 to S6 comprise at least one group of at least two controllable semiconductor switches connected in series between the positive DC bus bar 100 and the negative DC bus bar 200. In the example of FIG. 1 the inverter 20 is a semiconductor bridge implemented by means of six controllable semiconductor switches S1, S2, S3, S4, S5, S6. Each of the six controllable semiconductor switches S1, S2, S3, S4, S5, S6 may have an antiparallel diode connected across the switch, as illustrated. More specifically, the exemplary semiconductor bridge of the inverter 20 comprises three groups of two controllable power semiconductor switches connected in series between the positive DC bus bar 100 and the negative DC bus bar 200, i.e. groups S1+S4, S2+S5 and S3+S6. Each group of controllable power semiconductor switches S1 to S6 connected in series between the two DC bus bars thus forms a switching branch of the inverter 20. The number of such switching branches of the inverter 20 and thus the number of groups of controllable power semiconductor switches may vary. The controllable semiconductor switches S1 to S6 may be transistors, such as IGBTs (Insulated-Gate Bipolar Transistor) or FETs (Field-Effect Transistor), or other controllable semiconductor switches. The capacitance C may comprise one or more capacitors.

According to an embodiment, the positive DC bus bar 100 has at least one first connection terminal 110 for connecting to a positive pole or poles of the capacitance C and at least one second connection terminal 120 for connecting to the semiconductor switches S1 to S6. In the example of FIG. 1, in which the inverter 20 comprises three switching branches, the positive DC bus bar 100 has one second connection terminal 120 for each of the switching branches. In a similar manner, according to an embodiment, the negative DC bus bar 200 has at least one first connection terminal 210 for connecting to a negative pole or poles of the capacitance C and at least one second connection terminal 220 for connecting to the semiconductor switches S1 to S6. In the example of FIG. 1, also the negative DC bus bar 200 has one second connection terminal 220 for each of the three switching branches.

Figure 2:
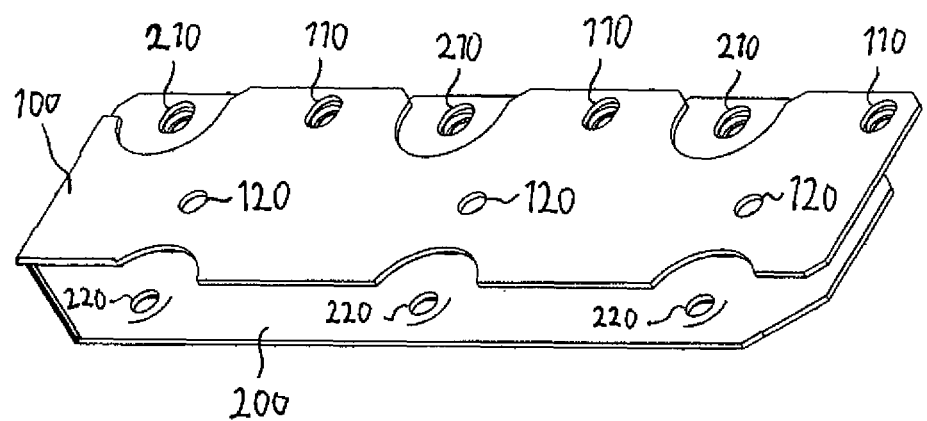
FIG. 2 shows DC conductors according to an embodiment.

According to an embodiment, one or more of the at least two DC conductors 100, 200 have a plate-like structure. This is illustrated in the example of FIG. 2, which shows the structure of two DC conductors 100, 200 according to an embodiment. It should be noted that the shape of the DC conductors 100, 200 may vary from that shown in FIG. 2 and depends on the converter system design. The two DC conductors 100, 200 of the example of FIG. 2 are bus bars. In use, the bus bars 100, 200 of FIG. 2 are preferably electrically insulated from each other with an insulating layer between them, for example. In the example, the upper DC bus bar 100 comprises three first connection terminals 110 for connecting to poles of the capacitance C and three second connection terminals 120 for connecting to the semiconductor switches. The lower DC bus bar 200 also comprises three first connection terminals 210 for connecting to poles of the capacitance C and three second connection terminals 220 for connecting to the semiconductor switches. The bus bars 100, 200 of FIG. 2 could be used in a converter system according to the example of FIG. 1, for example. Since the bus bars 100, 200 of FIG. 2 each comprise three first connection terminals 110, 210 for connecting to the capacitance C, it is possible to connect more than one capacitor or group of capacitors in parallel to the bus bars 100, 200. Such capacitors or a group of capacitors possibly connected in parallel may then together form the capacitance C. According to an embodiment, one or both of the bus bars 100, 200 consist of carbon fibre or a carbon fibre composite as described above. For example, one bus bar may consist of carbon fibre or a carbon fibre composite, while the other bus bar may consist of other material such as copper or other metal.

It is obvious to a person skilled in the art that, as technology advances, the basic idea of the invention may be implemented in various ways. The invention and its embodiments are thus not restricted to the above examples but may vary within the scope of the claims.

The invention claimed is:

1. A converter system comprising:
   a capacitance;
   an inverter comprising at least two controllable semiconductor switches; and
   at least two DC conductors connected between the capacitance and the at least two controllable semiconductor switches, wherein the whole of at least one of the at least two DC conductors is carbon fiber or carbon fiber composite having a higher resistivity than copper, wherein the carbon fiber is woven carbon fiber mat, and wherein the carbon fiber composite is carbon fiber-reinforced polymer and manufactured by injection moulding or pultrusion.

2. The converter system of claim 1, wherein said at least two DC conductors are bus bars.

3. The converter system of claim 2, wherein said at least two DC conductors comprise at least a positive DC bus bar and a negative DC bus bar.

4. The converter system of claim 3, wherein the positive DC bus bar is connected to a positive pole or poles of the capacitance and the negative DC bus bar is connected to a negative pole or poles of the capacitance.

5. The converter system of claim 4, wherein the at least two controllable semiconductor switches comprise at least one group of at least two controllable semiconductor switches connected in series between the positive DC bus bar and the negative DC bus bar.

6. The converter system of claim 1, wherein one or more of the at least two DC conductors have a plate-like structure.

7. The converter system of claim 1, wherein the capacitance comprises one or more capacitors.

8. The converter system of claim 1, wherein the controllable semiconductor switches are insulated-gate bipolar transistors, IGBT, or field-effect transistors, FET.

9. A converter system comprising:
   a capacitance;
   an inverter comprising at least two controllable semiconductor switches; and
   at least two DC conductors connected between the capacitance and the at least two controllable semiconductor switches, wherein the whole of at least one of the at least two DC conductors is carbon fiber having a higher resistivity than copper, wherein the carbon fiber is woven carbon fiber mat.

10. The converter system of claim 9, wherein said at least two DC conductors are bus bars, and said at least two DC conductors comprise at least a positive DC bus bar and a negative DC bus bar.

11. The converter system of claim 10, wherein the positive DC bus bar is connected to a positive pole or poles of the capacitance and the negative DC bus bar is connected to a negative pole or poles of the capacitance.

12. The converter system of claim 11, wherein the at least two controllable semiconductor switches comprise at least one group of at least two controllable semiconductor switches connected in series between the positive DC bus bar and the negative DC bus bar.

13. The converter system of claim 9, wherein one or more of the at least two DC conductors have a plate-like structure.

14. The converter system of claim 9, wherein the controllable semiconductor switches are insulated-gate bipolar transistors, IGBT, or field-effect transistors, FET.

15. A converter system comprising: a capacitance; an inverter comprising at least two controllable semiconductor switches; and at least two DC conductors connected between the capacitance and the at least two controllable semiconductor switches, wherein the whole of at least one of the at least two DC conductors is carbon fiber composite having a higher resistivity than copper, wherein the carbon fiber composite is carbon fiber-reinforced polymer and manufactured by injection moulding or pultrusion.

16. The converter system of claim 15, wherein said at least two DC conductors are bus bars, and said at least two DC conductors comprise at least a positive DC bus bar and a negative DC bus bar.

17. The converter system of claim 16, wherein the positive DC bus bar is connected to a positive pole or poles of the capacitance and the negative DC bus bar is connected to a negative pole or poles of the capacitance.

18. The converter system of claim 17, wherein the at least two controllable semiconductor switches comprise at least one group of at least two controllable semiconductor switches connected in series between the positive DC bus bar and the negative DC bus bar.

19. The converter system of claim 15, wherein one or more of the at least two DC conductors have a plate-like structure.

20. The converter system of claim 15, wherein the controllable semiconductor switches are insulated-gate bipolar transistors, IGBT, or field-effect transistors, FET.

* * * * *